Patented May 17, 1949

2,470,095

UNITED STATES PATENT OFFICE 2,470,095

DIPHENYLAMINE COMPOUNDS

Joseph B. Dickey, Rochester, N. Y., and James G. McNally, Oak Ridge, Tenn., assignors to Eastman Kodak Company, Rochester, N. Y., a corporation of New Jersey No Drawing. Application June 5, 1945, Serial No. 597,710

1 Claim. (Cl. 260—571)

This invention relates to diphenylamine compounds having the general formula:

wherein R represents a mono nitrated phenyl nucleus, the nitro group of which is in ortho position to the diphenylamine nitrogen atom and $R_1$ represents a phenyl nucleus containing a $\beta,\gamma$-dihydroxy-propoxy group in para position to the diphenylamine nitrogen atom and their application for the coloration of organic derivatives of cellulose textile materials.

It is an object of our invention to provide new diphenylamine compounds. A further object is to provide a process for preparing such compounds. A still further object is to provide materials dyed with such new compounds. Other objects will become apparent hereinafter.

The mono nitrated phenyl nucleus R can contain other substituents (e. g. a methyl group, a halogen atom or a methoxy group) in addition to the nitro group. Ordinarily, at least, the remaining position ortho to the diphenylamine nitrogen atom should not be substituted as it has been our experience that the introduction of a substituent in this position is detrimental to the light fastness of the compound. Similarly, the phenyl nucleus $R_1$ can contain substituents (e. g. a methyl group, a halogen atom or a methoxy group) in addition to the $\beta,\gamma$-dihydroxy-propoxy group. Normally neither the phenyl nucleus R nor the phenyl nucleus $R_1$ will contain more than one substituent in addition to the one they must have.

In accordance with our invention, we prepare our new diphenylamine compounds by condensing in the presence of an acid-binding, an ortho mononitro monocyclic halogenbenzene compound with a monocyclic primary arylamine of the benzene series containing a $\beta,\gamma$-dihydropropoxy group in para position to the amino group. As acid-binding agents, alkali metal carbonates, alkaline earth bicarbonates, alkali metal bicarbonates, alkaline earth carbonates and tertiary amines, e. g. dimethylamine, diethylamine and N-diethylaniline, can be employed.

Exemplary of the ortho mononitro monocyclic halogen-benzene compounds are o-nitrochlorobenzene, 2,5-dichloronitro-benzene, o-nitro-bromobenzene, o-nitrofluorobenzene, 2,5-difluoronitrobenzene, 2-chloro-5-methylnitrobenzene, 2-chloro-5-methoxynitrobenzene, o-nitroiodobenzene and 2,5-dibromonitrobenzene.

Illustrative of the monocyclic primary arylamines of the benzene series containing a $\beta,\gamma$-dihydroxypropoxy group in para position to the amino group are p-aminophenyl-$\beta,\gamma$-dihydroxypropyl ether

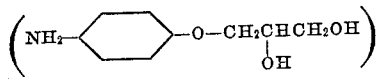

p - aminophenyl - ($\beta$ - methyl - $\beta,\gamma$ - dihydroxypropyl) ether

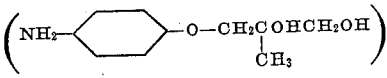

p - amino - m - methyl - $\beta,\gamma$ - dihydroxypropyl ether

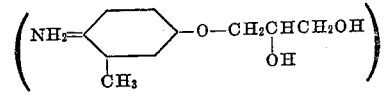

p - amino - m - methoxy - $\beta,\gamma$ - dihydroxypropyl ether, p - amino - o-chloro-$\beta,\gamma$-dihydroxypropyl ether and p-amino-m-methyl-($\beta$-methyl-$\beta,\gamma$-dihydroxypropyl) ether.

Our new dye compounds color organic derivatives of cellulose textile materials orange-yellow shades. They are especially of value for the dyeing of cellulose acetate rayon textile materials. In general, the dyeing obtained have exceptional light, sublimation and gas fastness properties as well as excellent fastness to washing. In addition these new dye compounds possess good affinity for the textile materials named. As illustrative of the fastness to light of the dye compounds it is here noted that a dyeing on a cellulose acetate rayon fabric with ¼% by weight of a dye mixture (⅓ pure dye) in which the dye was 4-$\beta,\gamma$-dihydroxypropoxy - 2' - nitrodiphenylamine showed only slight fading after 60 hours' exposure in a Fade-Ometer apparatus manufactured by the Atlas Electric Devices Company, Chicago, Illinois. This constitutes light fastness which is most exceptional for cellulose acetate fabrics. Further, if the equivalent of 1% or more pure dye is used the amount of fading to light after 60 hours' exposure is so slight that it either cannot be detected or is detectable with difficulty.

The following examples will serve to illustrate our new dyes and the manner of obtaining the same.

*Example 1.—4-$\beta,\gamma$-dihydroxypropoxy-2'-nitrodiphenylamine*

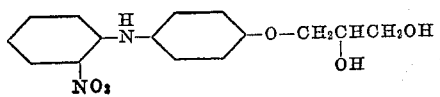

In a flask, fitted with a mechanical stirrer, were placed 157.5 grams of o-nitrochlorobenzene, 183 grams of p-aminophenyl-β,γ-dihydroxypropyl ether and 90 grams of sodium bicarbonate. The stirrer was started and the mixture in the flask heated to 140°–150° C. and maintained at this temperature until no more carbon dioxide is evolved, approximately 4–6 hours being required. After cooling 1 liter of water is added to the reaction mixture, following which the reaction mixture is raised to a temperature of 50° C. and filtered. The 4-β,γ-dihydroxypropoxy-2'-nitrodiphenylamine obtained upon filtration is washed well with water and dried. Upon crystallization from acetic acid or ethanol it melts at 109°–111° C. It colors cellulose acetate orange-yellow shades possessing exceptional light and gas fastness properties and with excellent fastness to washing.

*Example 2.—4(β-methyl-β,γ-dihydroxypropoxy)-2'-nitrodiphenylamine*

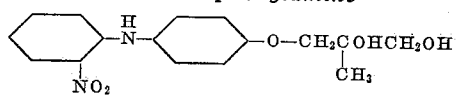

This dye compound is obtained by substituting 197 grams of p-aminophenyl-(β-methyl-β,γ-dihydroxypropyl) ether for the p-aminophenyl-β,γ-dihydroxypropyl ether of Example 1. It can be purified by crystallization from ethanol. It similarly colors cellulose acetate orange-yellow shades possessing exceptional light, sublimation and gas fastness properties and with excellent fastness to washing.

*Example 3.—4-β,γ-dihydroxypropoxy-2'-nitro-4'-chlorodiphenylamine*

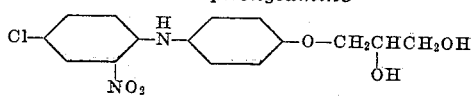

192 grams of 2,5-dichloro nitrobenzene, 183 grams of p-aminophenyl-β,γ-dihydroxypropyl ether and 90 grams of sodium bicarbonate are reacted together and the reaction mixture worked up in accordance with the procedure described in Example 1. The dye compound obtained can be purified by crystallization from ethanol. It colors cellulose acetate orange-yellow shades possessing outstanding light, sublimation and gas fastness properties and having excellent fastness to washing.

*Example 4.—3-chloro-4-β,γ-dihydroxypropoxy-2'-nitro-4'-fluorodiphenylamine*

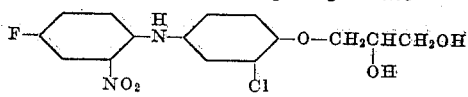

217 grams of 4-amino-2-chlorophenyl-β,γ-dihydroxypropyl ether, 161 grams of 2,5-difluoronitrobenzene and 90 grams of sodium bicarbonate are reacted together and the reaction mixture is worked up in accordance with the procedure described in Example 1. If desired the dye compound can be purified by crystallization from ethanol. It colors cellulose acetate orange-yellow shades possessing exceptional light, sublimation and gas fastness properties and with excellent fastness to washing.

Following the procedure described in the foregoing examples the following compounds can be prepared:

4-(β-methyl-β,γ-dihydroxypropoxy)-2'-nitro-4'-chlorodiphenylamine

4-β,γ-dihydroxypropoxy-2'-nitro-4'-fluorodiphenylamine

4-β,γ-dihydroxypropoxy-2'-nitro-4'-bromodiphenylamine

4-β,γ-dihydroxypropoxy-2'-nitro-4'-iododiphenylamine

4-β,γ-dihydroxypropoxy-2'-nitro-4'-methyldiphenylamine

4-β,γ-dihydroxypropoxy-2'-nitro-4'-methoxydiphenylamine 4-(β-methyl-β,γ-dihydroxypropoxy)-2'-nitro-4'-fluorodiphenylamine 4-(β-methyl-β,γ-dihydroxypropoxy)-2'-nitro-4'-methoxydiphenylamine 3-chloro-4-(β-methyl-β,γ-dihydroxypropoxy)-2'-nitrodiphenylamine 2-chloro-4-(β-methyl-β,γ-dihydroxypropoxy)-2'-nitrodiphenylamine While additional compounds falling within the scope of our invention can be prepared it is believed that the compounds shown are fully illustrative and that the disclosure of other specific compounds is unnecessary. It will be apparent from the foregoing how other compounds of our invention can be prepared.

In order that the preparation of the dye compounds may be entirely clear the preparation of a number of intermediate compounds used in their manufacture is indicated hereinafter.

*Preparation of p-aminophenyl-β,γ-dihydroxypropyl ether*

This compound can be prepared as described in Bulletin Society Chemie (4), volume 13, pages 528 and 529 (1913) which discloses the reaction of p-nitrophenol in alcoholic KOH with glycerol chlorohydrin (1-chloropropandiol-2,3 having the formula ClCH₂CHOHCH₂OH) followed by reduction of the nitro group to an amino group. This reduction can be carried out in any suitable manner, e. g., with hydrogen, under temperature and pressure, in the presence of Raney nickel and in the presence of an inert diluent medium or in the manner described in the article.

Other p-nitrophenol compounds such as 2-chloro-4-nitrophenol, 3-chloro-4-nitrophenol, 2-methyl-4-nitrophenol and 3-methyl-4-nitrophenol, for example, can be substituted for p-nitrophenol in the reaction just mentioned.

By the use of 1-chloro-2-methyl-propandiol-2,3

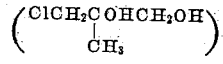

in place of 1-chloro-propandiol-2,3, the corresponding p-aminophenyl-(β-methyl-β,γ-dihydroxypropyl) ether compounds can be prepared. Thus 3-chloro-4-aminophenyl-(β-methyl-β,γ-dihydroxypropyl) ether

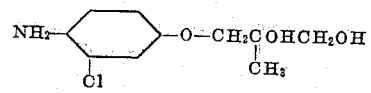

and 4-aminophenyl-(β-methyl-β,γ-dihydroxypropyl) ether, for example, can be prepared.

It is to be here noted that while, as indicated, the mono nitrated phenyl nucleus R can be substituted with an iodine atom the introduction of the iodine radical affects the light fastness of the compound adversely. Because of this normally it is preferred not to introduce the iodine atom into the dye molecule.

Typical organic derivatives of cellulose that can be colored include the hydrolyzed, as well as the unhydrolyzed, cellulose carboxylic esters, such as cellulose acetate, cellulose propionate and cellulose butyrate, and the hydrolyzed, as well as the unhydrolyzed mixed cellulose carboxylic esters, such as cellulose acetate propionate and cellulose acetate butyrate, and the cellulose ethers such as methyl cellulose, ethyl cellulose and benzyl cellulose.

The diphenylamine compounds of our invention are, for the most part, relatively insoluble in water and, accordingly, they may be advantageously directly applied to the textile material undergoing coloration in the form of an aqueous suspension which can be prepared by grinding the dye to a paste, in the presence of a sulfonated oil, soap, or other suitable dispersing agent and dispersing the resulting paste in water.

Direct dyeing operations can, with advantage, be conducted at temperatures of about 75° to 85° C., but any suitable temperature may be used. Thus, the textile material to be dyed or colored is ordinarily added to the dye bath at a temperature lower than that at which the main portion of the dyeing is to be effected, a temperature of from 45° to 55° C., for example, following which the temperature is raised to that selected for carrying out the operation. The temperature at which the dyeing operation is carried out will vary somewhat depending upon the particular material undergoing coloration. As is understood by those skilled in the art, the intensity of dyeing can be varied by varying the proportion of dye to the material undergoing coloration. Generally speaking, 1 to 3% by weight of dye to material is employed, although any desired proportions can be used.

We claim:

The diphenylamine compound having the formula:

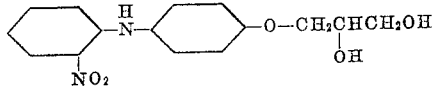

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,173,052 | Hitch et al. | Sept. 12, 1939 |
| 2,231,707 | Dickey et al. | Feb. 11, 1941 |
| 2,253,166 | Bigelow | Aug. 19, 1941 |
| 2,285,516 | Knight | June 9, 1942 |

FOREIGN PATENTS

| Number | Country | Date |
|---|---|---|
| 799,142 | France | June 6, 1936 |
| 47,411 | France | May 5, 1937 |
| (2nd addition to 799,142) | | |

OTHER REFERENCES

Degering: An Outline of Organic Nitrogen Compounds (Univ. Lithoprinters, Ypsilanti, Mich., 1945), page 562.